United States Patent
Johnson

(10) Patent No.: US 7,177,037 B2
(45) Date of Patent: Feb. 13, 2007

(54) METHOD AND APPARATUS FOR PROCESSING PRINT JOBS IDENTIFYING UNDEFINED PRINT QUEUES

(75) Inventor: Charles David Johnson, Boulder, CO (US)

(73) Assignee: International Business Machines Corporation, Armonk, NY (US)

( * ) Notice: Subject to any disclaimer, the term of this patent is extended or adjusted under 35 U.S.C. 154(b) by 835 days.

(21) Appl. No.: 09/727,071

(22) Filed: Nov. 30, 2000

(65) Prior Publication Data

US 2002/0063886 A1   May 30, 2002

Related U.S. Application Data

(60) Provisional application No. 60/198,081, filed on Apr. 17, 2000.

(51) Int. Cl.
*G06F 3/12* (2006.01)

(52) U.S. Cl. .................. 358/1.15; 358/1.16; 358/1.1; 710/52; 709/203

(58) Field of Classification Search .............. 358/1.15, 358/1.13
See application file for complete search history.

(56) References Cited

U.S. PATENT DOCUMENTS

| | | | | |
|---|---|---|---|---|
| 5,287,434 A | * | 2/1994 | Bain et al. | 235/462.15 |
| 5,371,888 A | * | 12/1994 | Lehnertz et al. | 718/100 |
| 5,467,434 A | * | 11/1995 | Hower et al. | 358/1.15 |
| 5,559,933 A | * | 9/1996 | Boswell | 358/1.15 |
| 5,768,583 A | | 6/1998 | Orzol et al. | |
| 5,825,988 A | * | 10/1998 | Collard et al. | 358/1.13 |
| 5,860,066 A | * | 1/1999 | Rouse | 705/1 |
| 5,880,447 A | * | 3/1999 | Okada et al. | 235/380 |
| 5,923,826 A | | 7/1999 | Grzenda et al. | |
| 5,930,465 A | | 7/1999 | Bellucco et al. | |
| 5,982,994 A | | 11/1999 | Mori et al. | |
| 6,075,615 A | * | 6/2000 | Nakamura | 358/1.14 |
| 6,108,689 A | * | 8/2000 | Fagen et al. | 709/206 |
| 6,219,148 B1 | * | 4/2001 | Takashima | 358/1.15 |

(Continued)

FOREIGN PATENT DOCUMENTS

JP   08-221227   *   8/1996

OTHER PUBLICATIONS

RFC1179: Line Printer Daemon Protocol; Network Printing Working Group; L. McLaughlin III, Editor; Aug. 1990, pp. 1-11.*

*Primary Examiner*—Kimberly Williams
*Assistant Examiner*—Beniyam Menberu
(74) *Attorney, Agent, or Firm*—David W. Lynch; Chambliss, Bahner & Stophel, PC

(57) ABSTRACT

A method and apparatus for processing print jobs on a printing device having at least one named print queue and a special residual print queue. Print jobs sent to a printer that are targeted for a print queue name that has not been defined for the printer are collected in the residual print queue. Print jobs are received, and print jobs having a print queue designation that matches a named print queue in the printing device are forwarded to the designated print queue. Print jobs having a print queue designation that does not match a named print queue in the printing device are forwarded to the residual print queue, and print jobs forwarded to the residual print queue are then printed.

27 Claims, 7 Drawing Sheets

U.S. PATENT DOCUMENTS 6,288,790 B1 * 9/2001 Yellepeddy et al. ....... 358/1.15
6,813,038 B1 * 11/2004 Kadowaki ................. 358/1.18
6,829,059 B1 * 12/2004 Kimura ..................... 358/1.15
2006/0061823 A1 * 3/2006 Riesel et al. ............... 358/1.16

* cited by examiner

METHOD AND APPARATUS FOR PROCESSING PRINT JOBS IDENTIFYING UNDEFINED PRINT QUEUES

RELATED APPLICATIONS

This application claims the benefit of the U.S. Provisional Application No. 60/198,081, filed Apr. 17, 2000, which is hereby incorporated herein by reference in its entirety.

FIELD OF THE INVENTION

This invention relates in general to printing systems, and more particularly to a method and apparatus for recognizing and processing print jobs that are directed to nonexistent or otherwise undefined print queues associated with a printing device.

DESCRIPTION OF RELATED ART

Desktop computers and computer networks are often connected to various peripheral devices to extend the computer's capabilities. One common peripheral device is a printer, which produces text and images in hardcopy format. There are many different types of printers, broadly grouped into impact printers and non-impact printers. Printers may also be categorized by the environment under which they operate, such as local and network printers. A local printer is one that is directly connected to one of the ports on a desktop, workstation, or other single host computer, and a network printer is shared by multiple computers over a network.

Local printers receive print data from a source, such as a single host computer, and network printers receive print data via a network that contains at least one host computer or network server. In typical printing applications, "print jobs" are submitted (via the direct connection or network) to the printer, as a means to pass the print data to the printer. Print jobs represent units of work to be run on a printer, and can include printing one or multiple files, depending on how the print jobs are requested. Print servers accept print jobs sent by multiple users on the network. Generally, a print server is a computer and/or firmware/software to provide users or a network with access to a central printer. The print server acts as a buffer, holding the information to be printed in memory until the printer is available. Print server software can report the status of print jobs waiting for printing, and can recognize the priority assigned to specific users. Practically any number of printers may be shared on a single network.

Print servers may spool the print jobs by saving them in a disk file until the printer is ready to accept them. To "spool" (simultaneous peripheral operation on line) a file is to utilize a program or device that controls the flow of data to an outputting device, such as a printer. Spooling allows the user to send data to a device that is already occupied, and the data will be passed onto the desired destination as soon as possible. In this manner, print jobs that are temporarily saved in a file are processed one at a time by a daemon, which is a job control program or "process" that runs in the background and controls the print server "queues" where such files are temporarily stored. The use of print server queues allows multiple users to concurrently send print jobs to the printer without encountering conflicts.

The print server queue is the queue where a print job is directed. Print jobs are passed from a client system to the server system using certain protocols. For example, one such protocol used to transmit print jobs between client and server systems is entitled RFC (Request For Comments) 1179. This protocol is widely used for communicating between line printer daemons on both the client and server systems This and other protocols require the client to identify a server queue name to which the print job will be directed, and an unrecognized queue name identified in a print command will cause the print command to be rejected or ignored.

Default server queue names may be defined by printer manufacturers, and a manufacturer may provide the ability for a printer administrator to change the server queue name. Therefore, it is not always clear what the print server queue name is. A problem arises where the user at the client system does not know the queue name on the printer system, since the print job cannot be processed using standard protocols unless the queue name is provided. Further, where an incorrect queue name is used in a print command, the print job will be rejected by the print server, or may be received but ignored.

Therefore, a need exists in the printing industry to eliminate such problems associated with the traditional threshold requirement of precisely knowing the print queue name before a print job can be processed. The present invention provides a solution to the aforementioned and other shortcomings of prior art printing systems, while offering additional advantages over the prior art.

SUMMARY OF THE INVENTION

To overcome limitations in the prior art described above, and to overcome other limitations that will become apparent upon reading and understanding the present specification, the present invention discloses a system, apparatus and method for recognizing and processing print jobs that are directed to nonexistent or otherwise undefined print queues associated with a printing device. The present invention provides for a special residual print queue to which print jobs are directed that do not identify valid, predefined print queue names. Print jobs that identify valid print queue names are directed to their respective print queues corresponding to the valid print queue names. All of the print jobs, both those associated with valid print queue names, and those residing in the special residual queue, may be printed. In this manner, print commands for print jobs that do not identify defined print queue names will not be rejected or ignored, but rather can be printed by the printing device.

In accordance with one embodiment of the invention, a method is provided for processing print jobs on a printing device having at least one named print queue and a residual print queue. Print jobs are received, and print jobs having a print queue designation that matches a named print queue in the printing device are forwarded to the designated print queue. Print jobs having a print queue designation that does not match a named print queue in the printing device are forwarded to the residual print queue, and print jobs forwarded to the residual print queue are then printed.

In accordance with another embodiment of the invention, a printer for receiving and processing print jobs from at least one client computing system is provided. The printer includes predefined print queues that each have a print queue name assigned to it. A residual print queue is also provided, along with a job control module that receives the print jobs from the client, and directs the print jobs targeted for undefined print queue names to the residual print queue. The print jobs in the residual print queue can then be printed, as can the print jobs in the other print queues.

In accordance with another embodiment, a computer-readable program storage medium embodying a program of instructions executable by a print server system is provided to process print jobs. The program of instructions provides for assigning print queue names to each of the print queues of the printer, and for defining a residual print queue in addition to the other print queues. The print jobs that identify destination print queue names that are not among the assigned print queue names of the print queues are forwarded to the residual print queue, and the print jobs stored in the residual print queue are then printed.

Another embodiment of the invention is directed to a computer network for facilitating the processing of print jobs from client computer systems by a server computer system. A client job control module at each client computer system generates print job commands for printing corresponding print jobs, where each of the print job commands includes a destination print queue name. Transmission media is coupled between each of the clients and the server computer system to transmit the print jobs from the clients to the server. Print queues at the server computer system are assigned a predetermined print queue name, and a residual print queue is provided at the server computer system. A server job control module, at the server computer system, receives the print job commands, and stores the print jobs in one of the print queues. The server job control module includes a comparator module to compare the destination print queue names to the predetermined print queue names, and to indicate when the destination print queue names do not correspond to any of the predetermined print queue names. A queue name resolution module receives the undefined queue name identifier, and directs the print jobs having the noncorresponding destination print queue names to the residual print queue. A print engine is provided to print the print jobs in the residual print queue and in the remaining preassigned print queue.

In accordance with yet another embodiment of the invention, a method is provided for processing print jobs on a printing device having one or more predefined print queues. The method includes assigning print queue names to each of the print queues. A residual print queue is defined in addition to the predefined print queues. Print jobs are forwarded to the residual print queue, if those print jobs identify destination print queue names that are not among the assigned print queue names of the predefined print queues. The print jobs stored in the residual print queue can then be printed. In another more specific embodiment, a default filter is applied to each of the print jobs that ultimately reaches the residual print queue. Print jobs in the print queues having assigned print queue names may also be filtered, and may be filtered individually according to queues or may utilize some common filters for more than one of these queues.

These and various other advantages and features of novelty that characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

The invention is described in connection with the embodiments illustrated in the following diagrams.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized, as structural and operational changes may be made without departing from the scope of the present invention.

Generally, the present invention is directed to a method and apparatus for processing all print jobs, notwithstanding the identification of a nonexisting print queue name in a print command. All print jobs sent to a printer that are targeted for a print queue name that has not been defined for the printer are collected in a special residual print queue. Print jobs that identify valid print queue names are directed to their respective queues corresponding to those valid print queue names. Print jobs residing in the queues associated with the valid print queue names, and those residing in the special residual queue are then available for printing. In this manner, print commands for print jobs that incorrectly identify print queue names can still be printed, and thus will not be rejected or ignored as in prior art systems.

Figure 1:
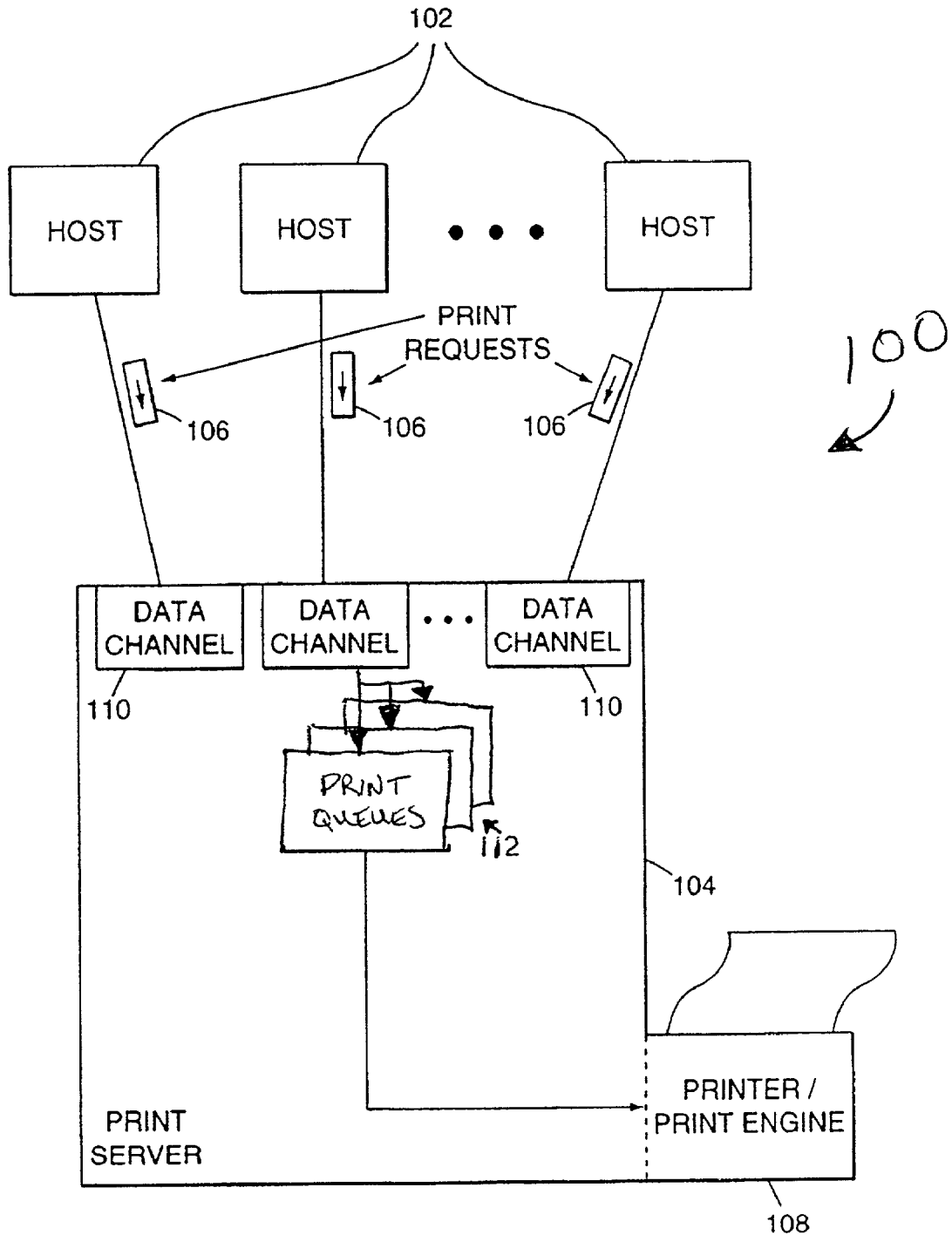
FIG. 1 is a block diagram of a system for transmitting print jobs between one or more client computer systems and a print server system.

FIG. 1 is a block diagram of a system 100 for transmitting print jobs between one or more client computer systems 102 and a print server system 104. In a client-server computing model such as the system 100, users work front-end client systems 102 or "hosts" that act as a front-end systems that interact with back-end server systems which provide, among other things, printing services. The computer network provides the communications platform on which many clients can interact with one or more servers. It should be noted that while the configuration of FIG. 1 is depicted as a single server client-server configuration, it will be readily apparent to those skilled in the art from the description provided herein that the invention is equally applicable to other network configurations, such as distributed server client-server configurations, peer-to-peer client-server configurations, and the like. Further, it will be appreciated by those skilled in the art that the following description is applicable to single host computer environments as well as network environments. Therefore, while various embodiments of the present invention are described in connection with a client-server arrangement, the present invention is not limited thereto.

In the example arrangement of FIG. 1, each of the hosts 102 in the system 100 can send print requests 106 to the print server 104, such as via a LAN, direct connection, or other known manner. The print server 104 receives the print requests or "print jobs" 106 from these various users and prints them in order of receipt or according to some predefined priority. It should be noted that the print server 104 of FIG. 1 can represent a print server computer separate from the printer 108, or alternatively the print server functions may reside within the printer 108.

The print jobs 106 are printed via a print engine associated with the physical printer 108, or alternatively may be directed to other printers on the network. In one particular embodiment, the print server functionality and circuitry is embedded within the printer, which includes one or more attachments over which print data is received. These attachments may be physical or logical. Examples of attachments are Ethernet and token ring. Attachments represent a subset of a more abstract entity referred to as "data channel," which are illustrated in FIG. 1 as data channels 110. Data channels represent any printer input configuration, i.e., methods of printing, examples of which include LPD (a printing protocol of TCI/IP), IPP (a printing protocol of TCP/IP), Pserver (a printing service of Novell NetWare), Appletalk (a Macintosh printing protocol), Coax, and Twinax. Each of the multiple data channels 110 may present print jobs for printing, and more than one data channel may present a job at the same time.

One or more print queues 112 associated with the print server 104 temporarily store the print jobs in memory, or alternatively on disk, until they are ready to be printed. The print queues 112 may be associated with a "spooling" module, which is a program or device that controls the flow of data to an outputting device, such as a printer. Spooling allows a user to send print data via spooling queues to a printer that is already occupied. In this manner, print jobs can be queued until the printer becomes available, and the data can be passed onto the desired destination printer. A printer may implement multiple queue names, and therefore there may be multiple print queues 112 corresponding to the multiple queue names. This is described in greater detail below.

Figure 2:
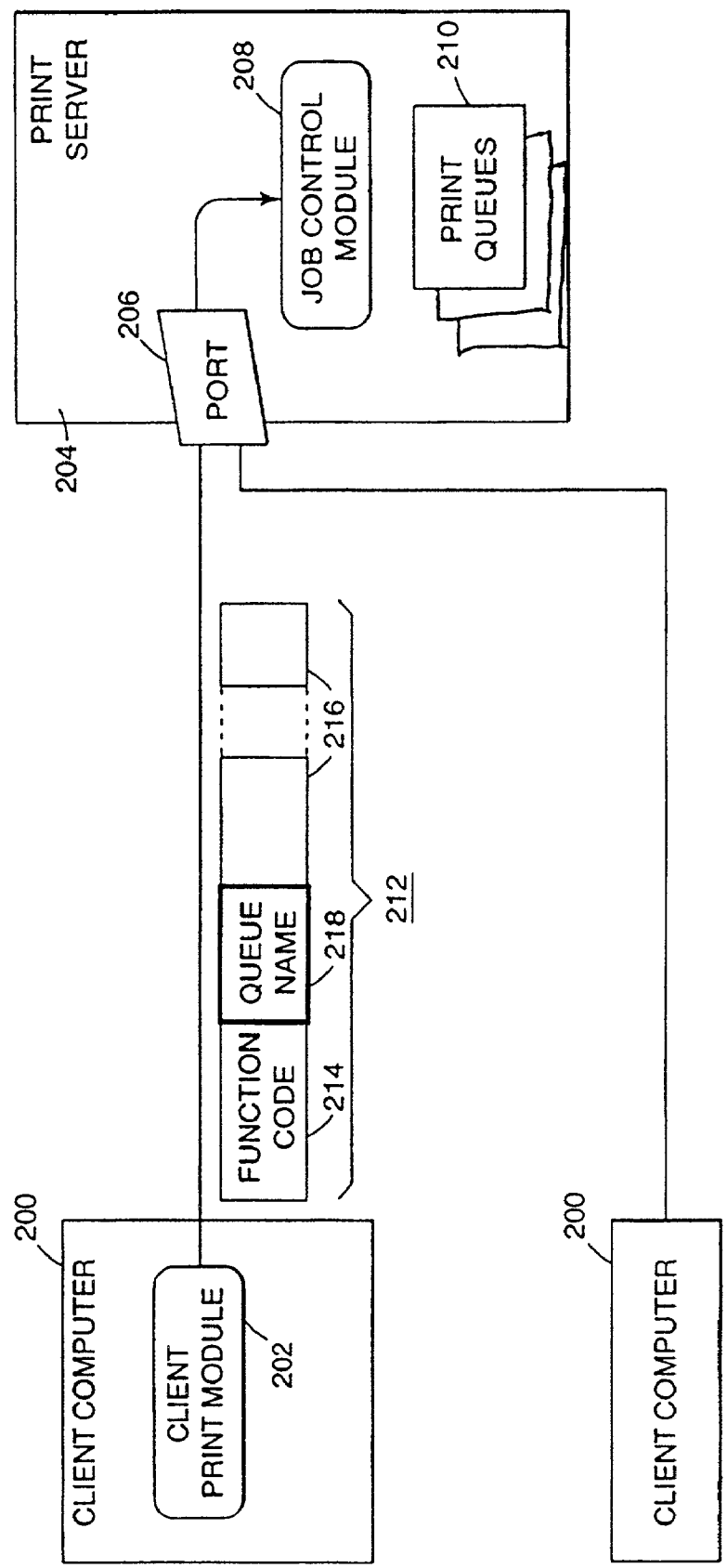
FIG. 2 is a block diagram illustrating an example of the client and print server systems communication via print job processes on the client and print server systems.

Transmission protocols are used to transmit the print jobs between the client systems and print server systems. One such protocol is the Line Printer Daemon (LPD) Protocol defined in Request for Comments (RFC) 1179. The LPD Protocol describes a print server protocol used for communicating between line printer daemons, which in general are autonomous programs or "processes" that run in the background to perform desired functions. FIG. 2 is a block diagram illustrating an example of how the client and print server systems can communicate via such processes on the client and print server systems.

Referring now to FIG. 2, one or more host/client systems 200 request print services via a client print module 202, such as a printer daemon process, running on the client system 200. The print server 204 monitors for these print job requests at a particular one or more ports 206. For example, in accordance with RFC 1179, the port on which a line printer daemon listens is port 515. The job control module 208, i.e., the line printer daemon, controls the receipt and processing of the print jobs received via port 206, and manages the print queues 210 in which the print jobs will be temporarily stored prior to printing.

Client computers 200 pass print jobs to the print server 204 via the protocol using print job commands, and may in some cases further use subcommands associated with a particular command. FIG. 2 provides an example of a command/subcommand 212 (hereinafter collectively referred to as the print "command") that is used to initiate a print function on the print server 204. In the illustrated example, a function code 214 is provided as part of the command to identify the requested function, such as to receive a print job at the print server 204. Command fields 216 represent other fields or operands that may be associated with a command that are not relevant to the present discussion.

Protocols used to transmit print jobs between client computing systems and print servers, such as the LPD Protocol discussed above, require the client computing system to identify a server queue name to which the print job will be directed. If no server queue name is specified, the printer will reject the command. This queue name is transmitted as an operand of the command 212, as depicted by queue name field 218. This queue name must correspond to queue names defined for the particular printer, and are generally defined by the printer manufacturer. Print queue names on the print server 204 may be changed, if the particular printer provides such queue name modification functionality.

It is possible that a user on a client system 200 may not know the print queue name to which the user wants to direct a print job(s). Further, because printer administrators may have changed the queue names, the user may not be aware of the change, and will be unable to identify the correct name using protocols (such as the LPD Protocol) that require inclusion of the precise print queue name to which the print job is directed. Without designating a queue name, the print job cannot be transmitted properly using such protocols, as an incorrect queue name results in the print job being rejected by the print server, or alternatively the print server may receive yet ignore the print job. The present invention allows print jobs to be processed by a print server when using such protocols, even if the queue name provided as part of the command does not conform to any of the queue names currently identified on the print server.

Figure 3:
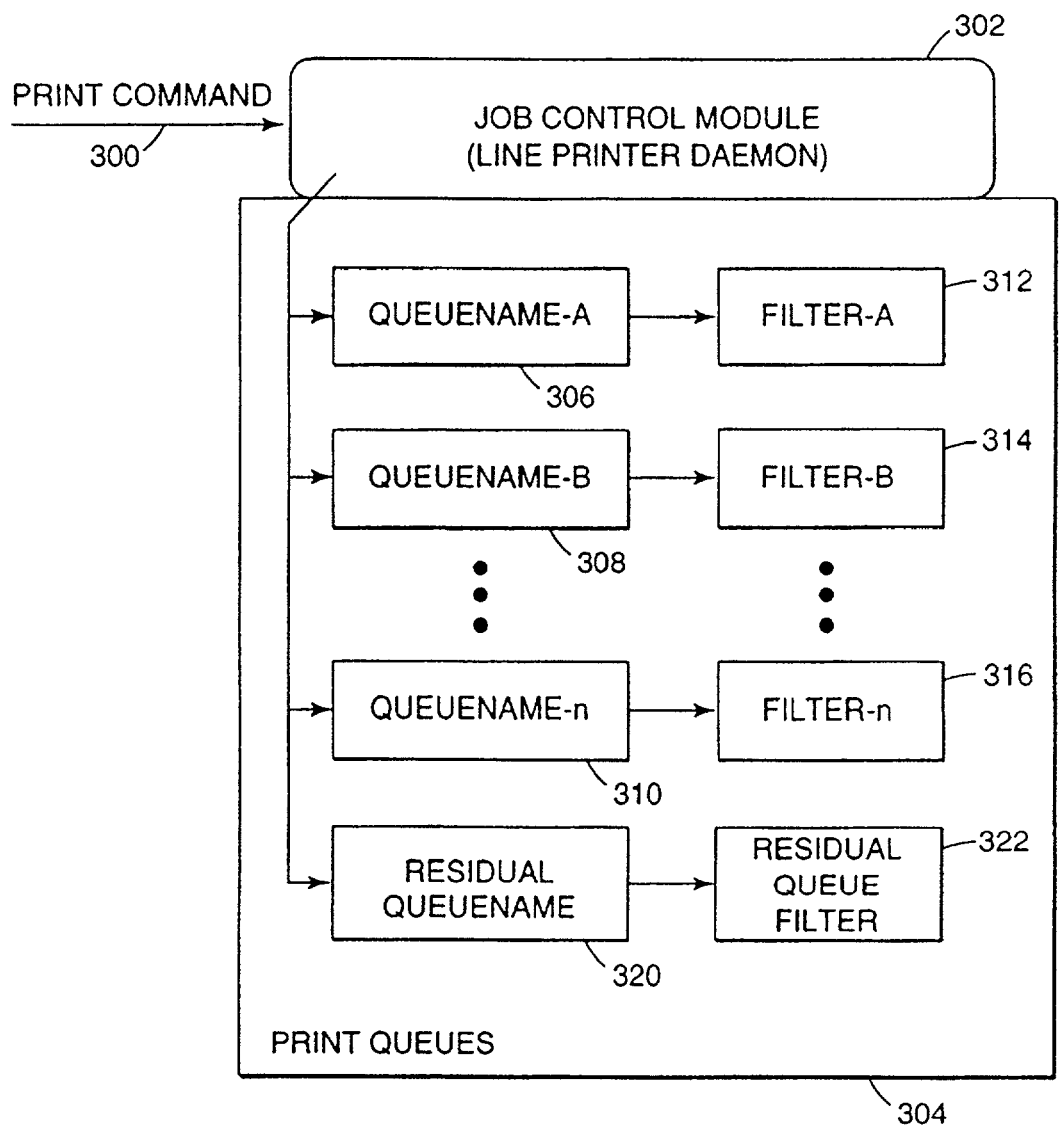
FIG. 3 is a block diagram illustrating the processing of print jobs at the print server in accordance with one embodiment of the present invention.

FIG. 3 is a block diagram illustrating the processing of print jobs at the print server, in accordance with one embodiment of the invention. As previously described, the print command shown on line 300 is received by the job control module 302, which in one embodiment is a line printer daemon. The job control module 302 manages the print queue 304, which may include multiple queues and corresponding queue names. In the illustrated embodiment of FIG. 3, these multiple queues are identified as queuename-A 306, queuename-B 308, through a definable number of queue names represented by queuename-n 310. The queue names associated with queues 306, 308 through 310 represent the print queue names assigned by the printer manufacturer or the printer administrator. The queue name may represent the address, pointer to an address, array address or other known identifier for its corresponding queue in memory or other storage module. When a print command on line 300 has a queue name operand in the queue name field (i.e., queue name field 218 of FIG. 2) that corresponds to one of the queue names, e.g., 306, 308, 310, the job control module 302 directs the associated print job to the print queue corresponding to that queue 306, 308, 310.

Data manipulation, referred to as filtering, may be applied by the print server to print jobs received through a queue. Filtering involves certain data manipulation, and may be applied by the server system to print jobs received through a particular print server queue. The data manipulation may include format conversion to convert from one printer format to another. Thus, one task of the filter is to transfer the print jobs into a printer specific format.

Different filters may be applied to each queue, as illustrated in FIG. 3. In the illustrated embodiment, print jobs associated with queuename-A 306 are passed through filter-A 312, print jobs associated with queuename-B 308 are passed through filter-B 314, and print jobs associated with queuename-n 310 are passed through filter-n 316. While FIG. 3 identifies each queuename being associated with a different filter, it is conceivable that multiple queuenames utilize the same filter. In accordance with the invention, when a print command on line 300 has a queue name operand in the queue name field (i.e., queue name field 218 of FIG. 2) that does not correspond to one of the predefined queue names 306, 308, 310, the job control module 302 directs the associated print job to a special queue 320 defined on the print server. This queue is a dedicated queue (hereinafter referred to as the "residual queue") to which all print jobs not conforming to one of the predefined queue names are directed. Print commands having nonconforming queue names are forwarded to this residual queue 320, which is assigned a corresponding queue name such as "residual queuename" in this example. In this manner, all queue names identified by print commands that are outside of the set of assigned queue names (e.g., assigned by the manufacturer and/or a printer administrator) will be directed to the residual queue 320, thereby serving as a "catch all" for all unassigned or otherwise incorrectly identified target print queues on the print server.

Various manners of forwarding print jobs having nonconforming queue names to the residual queue 320 may be implemented within the scope and spirit of the invention. For example, the job control module 302, upon recognizing a nonconforming queue name, can directly forward the print job to the residual queue 320, such as by forwarding the print job to an address corresponding to the location of the queue 320. Alternatively, the job control module 302 can recognize the nonconforming queue name, and convert the nonconforming queue name to have a queue name corresponding to the residual queue 320 (e.g., "residual queuename). The job control module 302 would then direct the print job to the residual queue 320 using the newly converted queue name of "residual queuename." In this manner, from the perspective of the print queue 304, it would be treated as if the print command had sent the print job with a valid queue name corresponding to the queue name of the residual queue 320 (e.g., "residual queuename"). In either case, the print job is still ultimately sent to the residual queue 320.

The residual queue filter 322 represents the filtering applied to print jobs stored in the residual queue 320. Thus, the filtering that a printer administrator sets for the residual queue 320 is applied to any print jobs that are processed through this residual queue name. In this manner, a common filter, i.e., filter 322, will be applied to all print jobs that are associated with nonexistent print queue names for that printer. As can be seen, this allows users to send print jobs to the printer using any queue name, and the printer will process any print job rather than rejecting or ignoring it.

Figure 4:
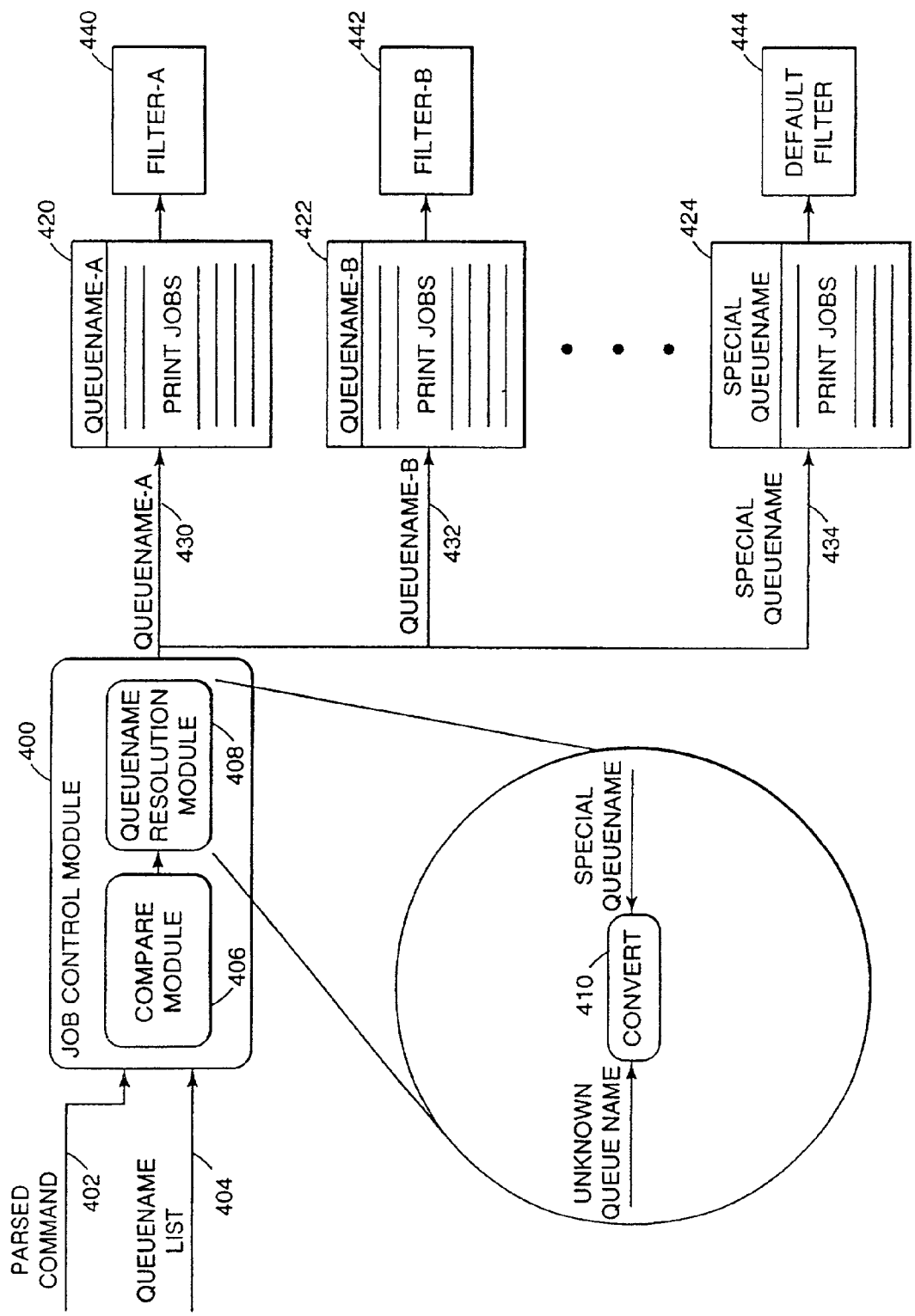
FIG. 4 is a block diagram illustrating the printer queue control in accordance with one embodiment of the invention.

FIG. 4 is a block diagram illustrating the printer queue control in accordance with one embodiment of the invention. The job control module 400 receives a parsed command shown on line 402 and a queuename list 404. The parsed command represents the queue name portion of the print command. For example, the command 212 of FIG. 2 can be parsed such that the queue name in queue name field 218 is provided to the job control module 400. The parsed command 402 is compared to the list of queue names 404 associated with the printer. A compare module 406, which in one embodiment is implemented using software, determines whether the queue name from the parsed command 402 is equivalent to any of the predefined queue names in the queuename list 404. If there is no matching queue name to that which is provided in the parsed command, the queuename resolution module 408 associates the queue name with a special, predefined queue name. This is logically represented by the conversion module 410, where an unknown queue name is converted 410 to the predefined special queuename.

Depending on the queue name, the received print job is sent to one of the queues 420, 422, 424. Where the queue name associated with the print command is a recognized queue name, such as queuename-A shown on line 430 or queuename-B shown on line 432, the print job is identified by the job control module 400 and directed to the appropriate queue 420, 422 respectively. Any number of queues can be implemented, where each queue is associated with a particular queue name.

All queue names that are not recognized are given a special queuename, as shown on line 434. This special queuename is then associated with queue 424, which is reserved for all print jobs received with unrecognized print queue names. For example, assuming two predefined queuenames of "queuename-A" and "queuename-B" as shown in FIG. 4, a print command received at the job control module 400 that recognizes a queuename of "LPRPRINTER" from the parsed command 402 will not recognize the queue name "LPRPRINTER" as being equivalent to either "queuename-A" or "queuename-B." The job control module 400 therefore associates a special queue name to the print job(s) sent with the queue name "LPRPRINTER," thus causing this print jobs(s) to be placed in the residual queue 424. In this manner, any print job received by the printer will ultimately be processed and printed.

As described above, each of the individual queues can have a filter associated with it. In FIG. 4, Filter-A 440 performs filtering functions on print jobs queued in the queue 420, and Filter-B 442 performs filtering functions on print jobs queued in the queue 422. All print jobs having unrecognized print queue names that are stored in the special queue 424 are passed through a default filter 444.

Figure 5:
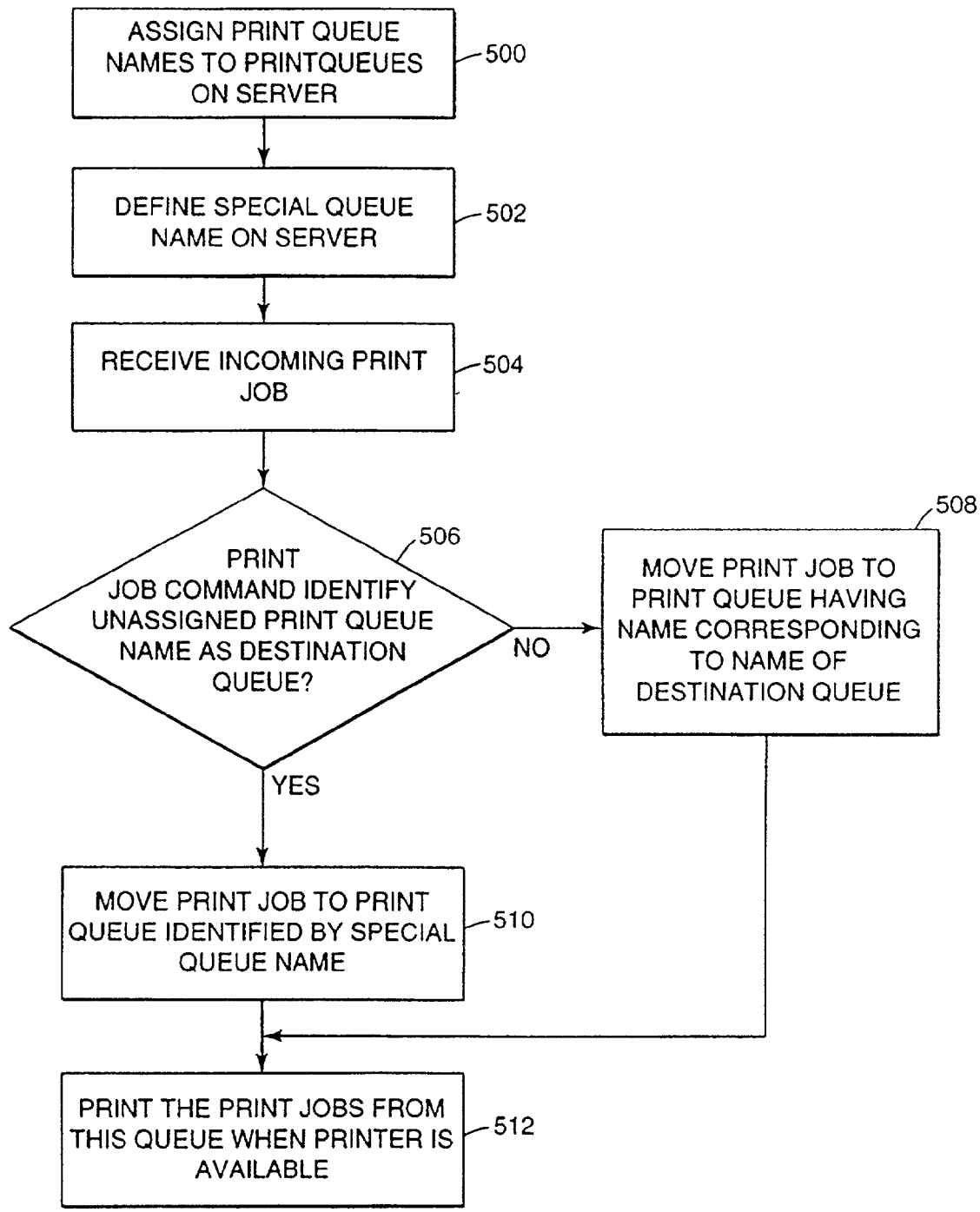
FIG. 5 is a flow diagram illustrating a process of processing print jobs in accordance with the present invention.

FIG. 5 is a flow diagram illustrating a process of processing print jobs in accordance with the present invention. One or more desired print queues associated with a printer are assigned print queue names, as seen at operation 500. The print queues may be implemented on an associated computing device such as a dedicated print server, or may be implemented using print server resources embedded within the printing device.

A special queue name on the print server is also defined 502. An incoming print job is received 504, and it is determined 506 whether the print job command identifies an unassigned print queue name as its destination queue. If not, i.e., the print job identifies a valid print queue name, the print job is placed on the print queue that corresponds to that valid print queue name, as illustrated at operation 508. If the print job command identifies an unassigned print queue name, the print job is placed on the print queue corresponding to the special queue name, as illustrated at operation 510. The print jobs associated with valid print queue names, as well as the print jobs associated with invalid print queue names associated with the special queue, are printed 512 when the printer becomes available.

Figure 6:
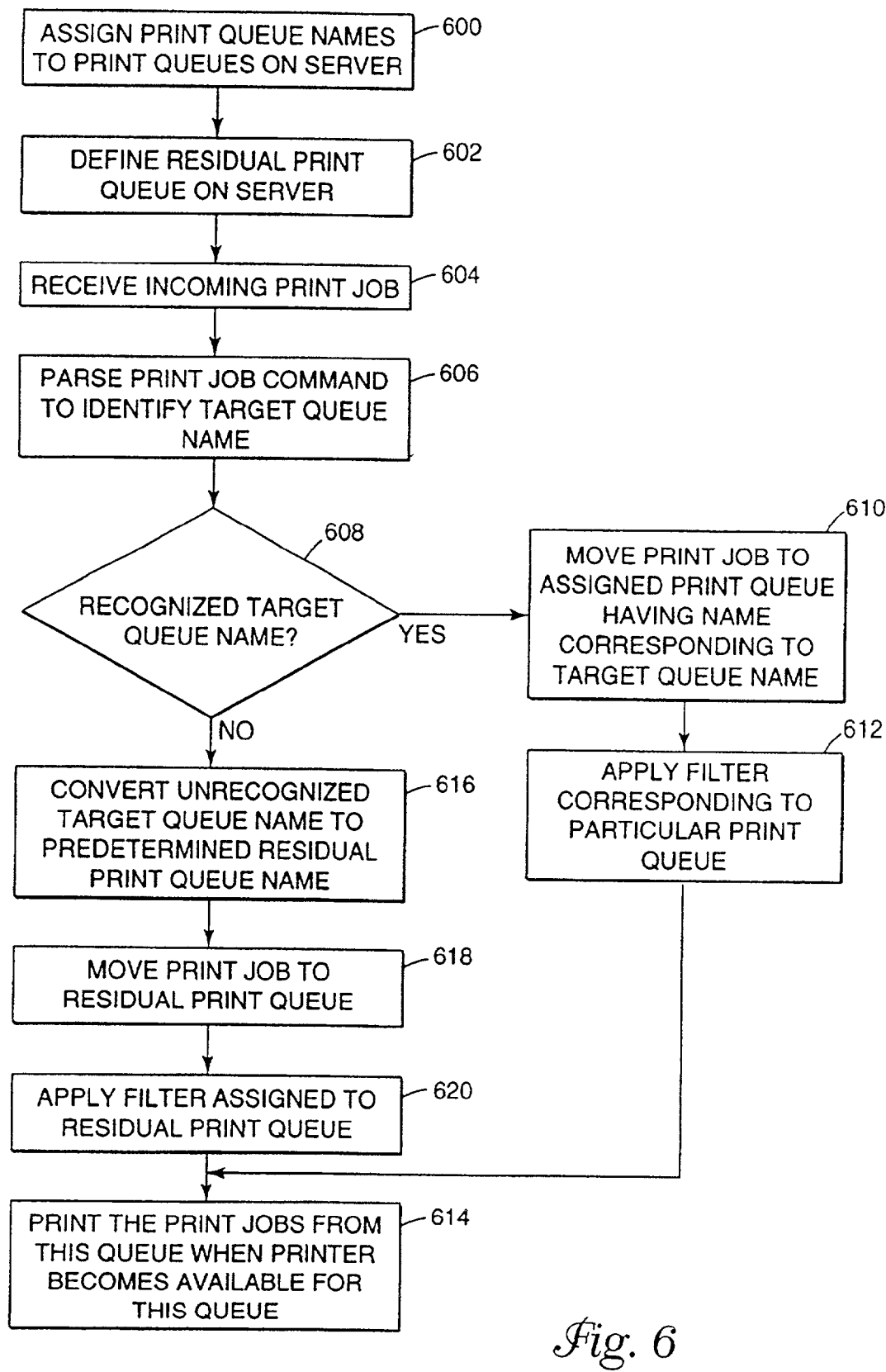
FIG. 6 provides a flow diagram of another embodiment of a process of processing print jobs in accordance with the present invention.

FIG. 6 provides a flow diagram of another embodiment of a process of processing print jobs in accordance with the present invention. Desired print queue names are assigned 600 to print queues on the server, and a residual print queue is also defined 602 on the server. Incoming print jobs are received 604, and parsed 606 to identify the target queue name. It is determined at decision operation 608 whether the target queue name identified in the print command is recognized or not. If the target queue name is recognized, the print job is moved 610 to its assigned print queue having a name corresponding to the target queue name. A filter corresponding to that print queue is then applied 612 to the print jobs in that queue. The print jobs associated with these queues are printed 614 when the printer becomes available.

Where the target queue name is not recognized as determined at decision operation 608, the unrecognized target queue name is converted to a predetermined residual print queue name as seen at operation 616. The print jobs now having the residual print queue name are moved 618 to a residual print queue. A default filter is then applied to each of the print jobs in the residual print queue as illustrated at operation 620, and the print jobs in the residual print queue are printed 614 when the printer becomes available.

Hardware, firmware, software or a combination thereof may be used to perform the various operations described above. The functional modules used in connection with the invention may reside in a computing device, such as a print server, or the functional modules may perform these print server activities as resident modules on the printing device itself. An example computing structure that can be used in connection with firmware and other computer programs to carry out the present invention is illustrated in FIG. 7.

Figure 7:
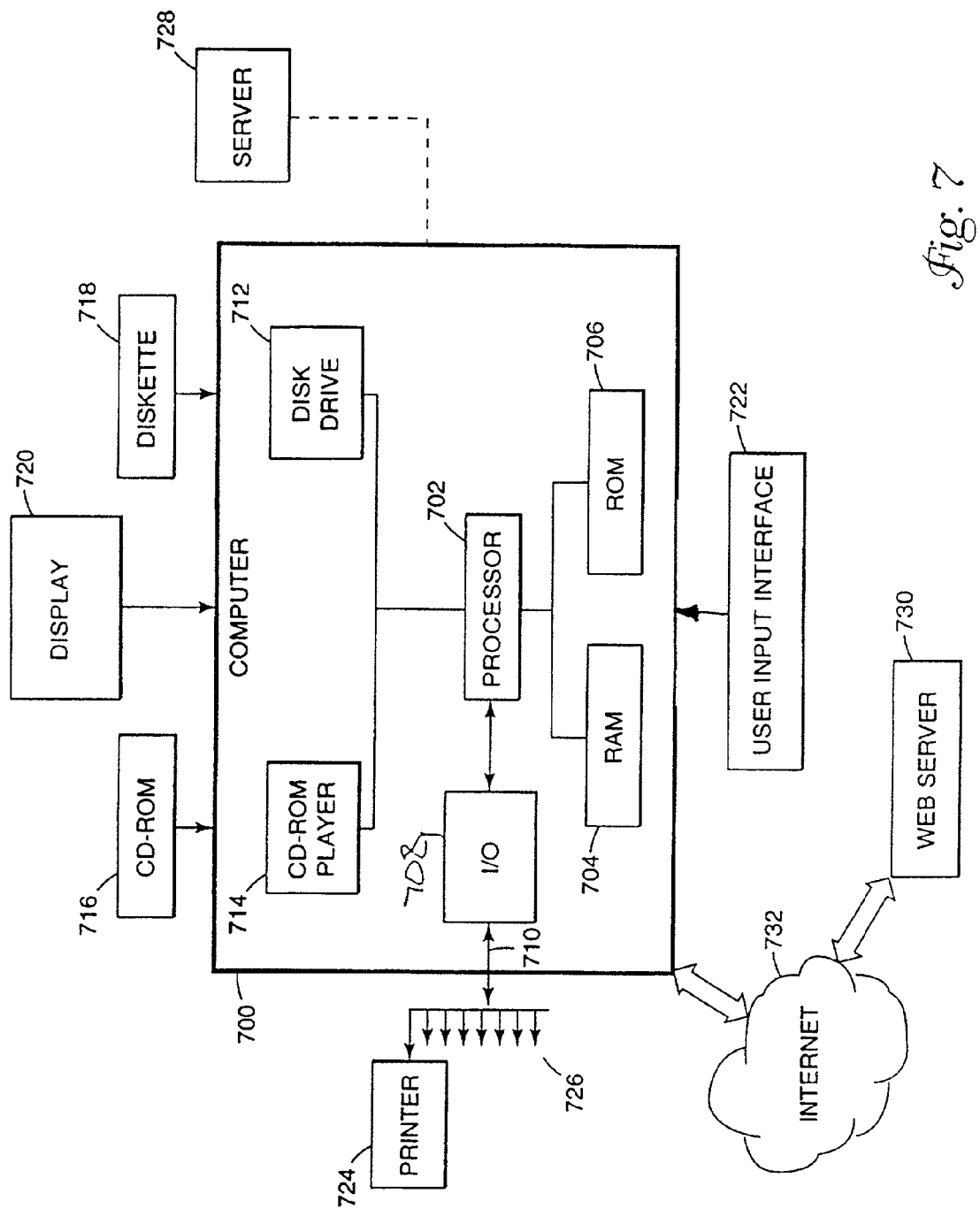
FIG. 7 is a block diagram of an example computing arrangement that can be used in connection with software, firmware and other computer programs to carry out the present invention.

Referring now to FIG. 7, a system block diagram of a example print server system 700 is shown, in which the principles of the present invention may be applied. A computing arrangement suitable for performing the print server functions in accordance with the present invention typically includes a central processor (CPU) 702 coupled to random access memory (RAM) 704 and read-only memory (ROM) 706. The processor 702 may communicate with other internal and external components through input/output (I/O) circuitry 708 and bussing 710. The computing arrangement 700 may also include one or more data storage devices, including hard and floppy disk drives 712, CD-ROM drives 714, and other hardware capable of reading and/or storing information. In one embodiment, software containing job control applications, such as line printer daemons for carrying out the present invention, may be stored and distributed on a CD-ROM 716, diskette 718 or other forms of media capable of portably storing information. These storage media may be inserted into, and read by, devices such as the CD-ROM drive 714, the disk drive 712, etc. The software may also be transmitted to the computing arrangement 700 via data signals, such as being downloaded electronically via a network such as the Internet. The computing arrangement 700 may also include a display 720, a user input interface 722 such as a mouse or keyboard, and one or more printers 724. As previously indicated, the computing arrangement 700 may be embedded within the printer 724 itself. External print jobs are generally provided to the computing arrangement/print server 700 via I/O ports 726. Print jobs originating from the print server 700 itself may also be provided to the printer(s) 724. The computing arrangement 700 may optionally be connected to other network servers 728 in an intranet or local network configuration. The computer may further be part of a larger network configuration as in a global area network (GAN) such as the Internet. In such a case, the computer accesses one or more web servers 730 via the Internet 732. Computing modules as described herein may reside on a print server connected to the printer(s), or alternatively may be embedded in whole or in part within the printer itself.

Using the foregoing specification, the invention may be implemented as a machine, process, or article of manufacture by using standard programming and/or engineering techniques to produce programming software, firmware, hardware or any combination thereof.

Any resulting program(s), having computer-readable program code, may be embodied within one or more computer-usable media such as memory devices or transmitting devices, thereby making a computer program product or article of manufacture according to the invention. As such, the terms "article of manufacture" and "computer program product" as used herein are intended to encompass a computer program existent (permanently, temporarily, or transitorily) on any computer-usable medium such as on any memory device or in any transmitting device.

One skilled in the art of computer science will easily be able to combine the software created as described with appropriate general purpose or special purpose computer hardware to create a computer system and/or computer subcomponents embodying the invention, and to create a computer system and/or computer subcomponents for carrying out the method of the invention.

Various embodiments have been described above, and are further described below. A method embodiment processes print jobs on a printing device having at least one named print queue and a residual print queue, and may include receiving print jobs, forwarding print jobs having a print queue designation that matches a named print queue in the printing device to the designated print queue, forwarding print jobs having a print queue designation that does not match a named print queue in the printing device to the residual print queue, and printing a print job forwarded to the residual print queue. Other embodiments also include printing a print job forwarded to a named print queue in the printing device; converting a print queue designation of a print job having a print queue designation that does not match a named print queue in the printing device, to a residual print queue designation, wherein the residual print queue designation corresponds to the residual print queue; forwarding print jobs to the residual print queue by recognizing converted print queue designations as the residual print queue designation, and forwarding the corresponding print jobs to the residual print queue in response thereto; and determining whether the print jobs are targeted for the residual print queue by comparing the residual print queue designation to a group of queue designations including the residual print queue designation and the print queue designations that match a named print queue. Other embodiments further include determining whether the print jobs identify print queue designations that do not match a named print queue; determining whether the print jobs identify print queue designations that do not match a named print queue by comparing a queue name field in a corresponding print job command to each of the print queue designations corresponding to the named print queues; and where the print job command is transmitted in accordance to a Line Printer Daemon Protocol (LPD Protocol). Embodiments include common filtering of the print jobs that identify the print queue designations that do not match a named print queue with a shared filter; filtering the print jobs that identify the print queue designations that match a named print queue with one or more filters different from the shared filter; and associating each of the filters corresponding to the print queue designations that match a named print queue with a different print queue. The print jobs may be transmitted from a client computer system to the printing device, and the client computer system and the printing device may be configured in a network. Forwarding print jobs to the residual print queue may include transmitting the print jobs as part of a print command, where the print command includes a queue name field to identify the print queue designation. A printing system, such as a printer, in one embodiment receives and processes print jobs from at least one client computing system, and includes one or more predefined print queue each having a print queue name respectively assigned thereto, a residual print queue, a job control module configured and arranged to receive the print jobs from the client computing system and to direct the print jobs that do not identify the print queue names assigned to the predefined print queues to the residual print queue, and a print engine to print one or more of the print jobs in the residual print queue. The job module may include a compare module to determine whether the print job identifies one of the print queue names assigned to the predefined print queues. The job control module may further include a queue name resolution module coupled to receive an indication from the compare module indicating that the print job identifies an undefined print queue name, and may convert the undefined print queue name to a special print queue name corresponding to the residual print queue. A print server in one embodiment processes print jobs, wherein the print server includes one or more print queues each preassigned a print queue name, and includes a residual print queue that does not correspond to any of the preassigned print queue names, means for receiving an incoming print job command, wherein the incoming print job command includes a target queue name, means for determining whether the target queue name associated with each of the incoming print job commands conforms to one of the preassigned print queue names, means for directing the print jobs whose target queue name conforms to one of the preassigned print queue names to its respective print queue, means for directing the print jobs whose target queue name does not conform to one of the preassigned print queue names to the residual print queue, and means for printing the print jobs in the print queues and the residual print queue. A print server in accordance with the invention may include a first filter scheme for formatting the print jobs in the residual print queue according to a first filter methodology, and second filter scheme for formatting the print jobs in at least one of the print queues having the preassigned print queue name according to second filter methodology. Embodiments include a computer-readable program storage medium tangibly embodying a program of instructions executable by a print server system to process print jobs by performing steps including assigning print queue names to each of the one or more print queues of the print server system, defining a residual print queue in addition to the one or more print queues, forwarding print jobs, that identify destination print queue names that are not among the assigned print queue names of the one or more print queues, to the residual print queue, and printing one or more of the print jobs stored in the residual print queue. The program of instructions may also include defining a residual print queue name for the residual print queue and converting each of the destination print queue names that are not among the assigned print queue names to the residual print queue name; determining whether the print jobs identify destination print queue names that are not among the assigned print queue names; and commonly filtering the print jobs that identify the destination print queue names that are not among the assigned print queue names with a shared filter. A computer network embodiment for facilitating the processing of print jobs from a plurality of client computer systems by at least one server computer system is also provided, which may include a client job control module, at each client computer system, to generate print job commands for printing corresponding print jobs, wherein each of the print job commands includes a destination print queue name, and transmission media coupled between each of the client computer systems and the server computer system to transmit the print jobs from the client computer systems to the server computer system, and a plurality of print queues, at the server computer system, wherein each of the plurality of print queues is assigned a predetermined print queue name, and a residual print queue at the server computer system, and a server job control module, at the server computer system, to receive the print job commands transmitted via the transmission media, and to store the print jobs in one of the plurality of print queues. The job control module may include a compare module configured and arranged to compare the destination print queue names to the predetermined print queue names, and to provide a undefined queue name identifier if the destination print queue names do not correspond to any of the predetermined print queue names, and may include a queue name resolution module coupled to receive the undefined queue name identifier, and to direct the print jobs having the destination print queue names that do not correspond to any of the predetermined print queue names to the residual print queue upon receipt of the undefined queue name identifier. A print engine may be coupled to the server computer system to print one or more of the print jobs in the residual print queue. A method embodiment for processing print jobs on a printing device having one or more print queues includes assigning print queue names to each of the one or more print queues of the printing device, defining a residual print queue in addition to the one or more print queues, forwarding print jobs that identify destination print queue names that are not among the assigned print queue names of the one or more print queues to the residual print queue, and printing one or more of the print jobs stored in the residual print queue. Embodiments may include forwarding second print jobs, that identify destination print queue names that correspond to one of the assigned print queue names, to its corresponding print queue of the printing device, and printing one or more of the print jobs stored in the print queues having the assigned print queue names; defining a residual print queue name for the residual print queue, and converting each of the destination print queue names that are not among the assigned print queue names to the residual print queue name; commonly filtering the print jobs that identify the destination print queue names that are not among the assigned print queue names with a shared filter; and filtering the print jobs that identify the destination print queue names that are among the assigned print queue names with one or more filters different from the shared filter.

Thus, in accordance with the present invention, a system and method is provided for recognizing and processing print jobs that are directed to nonexistent or otherwise undefined print queues associated with a printing device. The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

What is claimed is:

1. A method for processing print jobs on a printing device having at least one named print queue and a residual print queue comprising:
    receiving print jobs;
    forwarding print jobs having a print queue designation that matches a named print queue in the printing device to the designated print queue;
    forwarding, to the residual print queue, print jobs having a print queue designation that does not match a named print queue in the printing device when the print job is initially received by the printing device; and
    forwarding print jobs from the residual print queue to a print engine for printing.

2. The method of claim 1, further comprising printing a print job forwarded to a named print queue in the printing device.

3. The method of claim 1, further comprising converting a print queue designation of a print job having a print queue designation that does not match a named print queue in the printing device, to a residual print queue designation, wherein the residual print queue designation corresponds to the residual print queue.

4. The method of claim 3, wherein forwarding print jobs to the residual print queue comprises recognizing converted print queue designations as the residual print queue designation, and forwarding the corresponding print jobs to the residual print queue in response thereto.

5. The method of claim 4, further comprising determining whether the print jobs are targeted for the residual print queue by comparing the residual print queue designation to a group of queue designations including the residual print queue designation and the print queue designations that match a named print queue.

6. The method of claim 1, further comprising determining whether the print jobs identify print queue designations that do not match a named print queue.

7. The method of claim 6, wherein determining whether the print jobs identify print queue designations that do not match a named print queue comprises comparing a queue name field in a corresponding print job command to each of the print queue designations corresponding to the named print queues.

8. The method of claim 7, wherein the print job command is transmitted in accordance to a Line Printer Daemon Protocol (LPD Protocol).

9. The method of claim 1, further comprising commonly filtering the print jobs that identify the print queue designations that do not match a named print queue with a shared filter.

10. The method of claim 9, further comprising filtering the print jobs that identify the print queue designations that match a named print queue with one or more filters different from the shared filter.

11. The method of claim 10, wherein each of the one or more filters corresponding to the print queue designations that match a named print queue is associated with a different one of the print queues.

12. The method of claim 1, further comprising transmitting the print jobs from a client computer system to the printing device.

13. The method of claim 12, wherein at least the client computer system and the printing device are configured in a network.

14. The method of claim 1, wherein forwarding print jobs to the residual print queue comprises transmitting the print jobs as part of a print command, wherein the print command includes a queue name field to identify the print queue designation.

15. A printer for receiving and processing print jobs from at least one client computing system, the printer comprising:
    one or more predefined print queue each having a print queue name respectively assigned thereto;
    a residual print queue;
    a job control module configured and arranged to receive the print jobs from the client computing system and to direct the print jobs that do not identify the print queue names assigned to the predefined print queues when the print jobs are initially received by the printer to the residual print queue; and
    a print engine for printing one or more of the print jobs in the residual print queue.

16. The printer as in claim 15, wherein the job control module comprises a compare module to determine whether the print job identifies one of the print queue names assigned to the predefined print queues.

17. The printer as in claim 16, wherein the job control module further comprises a queue name resolution module coupled to receive an indication from the compare module indicating that the print job identifies an undefined print queue name, and to convert the undefined print queue name to a special print queue name corresponding to the residual print queue.

18. A print server for processing print jobs, wherein the print server includes one or more print queues each preassigned a print queue name, the print server comprising:
    a residual print queue that does not correspond to any of the preassigned print queue names;
    means for receiving an incoming print job command, wherein the incoming print job command includes a target queue name;
    means for determining whether the target queue name associated with each of the incoming print job commands conforms to one of the preassigned print queue names;
    means for directing the print jobs whose target queue name conforms to one of the preassigned print queue names to its respective print queue;
    means for directing the print jobs whose target queue name does not conform to one of the preassigned print queue names when the print jobs are initially received by the means for receiving the incoming print job command to the residual print queue;
    means for forwarding the print jobs in the print queues and the residual print queue to a print engine for printing.

19. A computer-readable program storage medium tangibly embodying a program of instructions executable by a print server system to process print jobs by performing steps comprising:
    assigning print queue names to each of the one or more print queues of the print server system;
    defining a residual print queue in addition to the one or more print queues;

forwarding print jobs, that when initially received identify destination print queue names that are not among the assigned print queue names of the one or more print queues, to the residual print queue; and forwarding one or more of the print jobs stored in the residual print queue to a print engine for printing.

20. The computer-readable program storage medium of claim 19, wherein the program of instructions further performs the steps comprising:

defining a residual print queue name for the residual print queue; and converting each of the destination print queue names that are not among the assigned print queue names to the residual print queue name.

21. The computer-readable program storage medium of claim 19, wherein the program of instructions further performs the step comprising determining whether the print jobs identify destination print queue names that are not among the assigned print queue names.

22. The computer-readable program storage medium of claim 19, wherein the program of instructions further performs the step comprising commonly filtering the print jobs that identify the destination print queue names that are not among the assigned print queue names with a shared filter.

23. A method for processing print jobs on a printing device having one or more print queues; the method comprising:

assigning print queue names to each of the one or more print queues of the printing device;

defining a residual print queue in addition to the one or more print queues;

forwarding print jobs, that identify destination print queue names when the print jobs are initially received that are not among the assigned print queue names of the one or more print queues, to the residual print queue; and forwarding one or more of the print jobs stored in the residual print queue to a print engine for printing.

24. The method of claim 23, further comprising:

forwarding second print jobs, that identify destination print queue names that correspond to one of the assigned print queue names, to its corresponding print queue of the printing device; and printing one or more of the print jobs stored in the print queues having the assigned print queue names.

25. The method of claim 23, further comprising:

defining a residual print queue name for the residual print queue; and converting each of the destination print queue names that are not among the assigned print queue names to the residual print queue name.

26. The method of claim 23, further comprising commonly filtering the print jobs that identify the destination print queue names that are not among the assigned print queue names with a shared filter.

27. The method of claim 26, further comprising filtering the print jobs that identify the destination print queue names that are among the assigned print queue names with one or more filters different from the shared filter.

* * * * *